Jan. 6, 1953     A. G. GROSS     2,624,182
ABSORPTION REFRIGERATION APPARATUS
Filed May 21, 1949
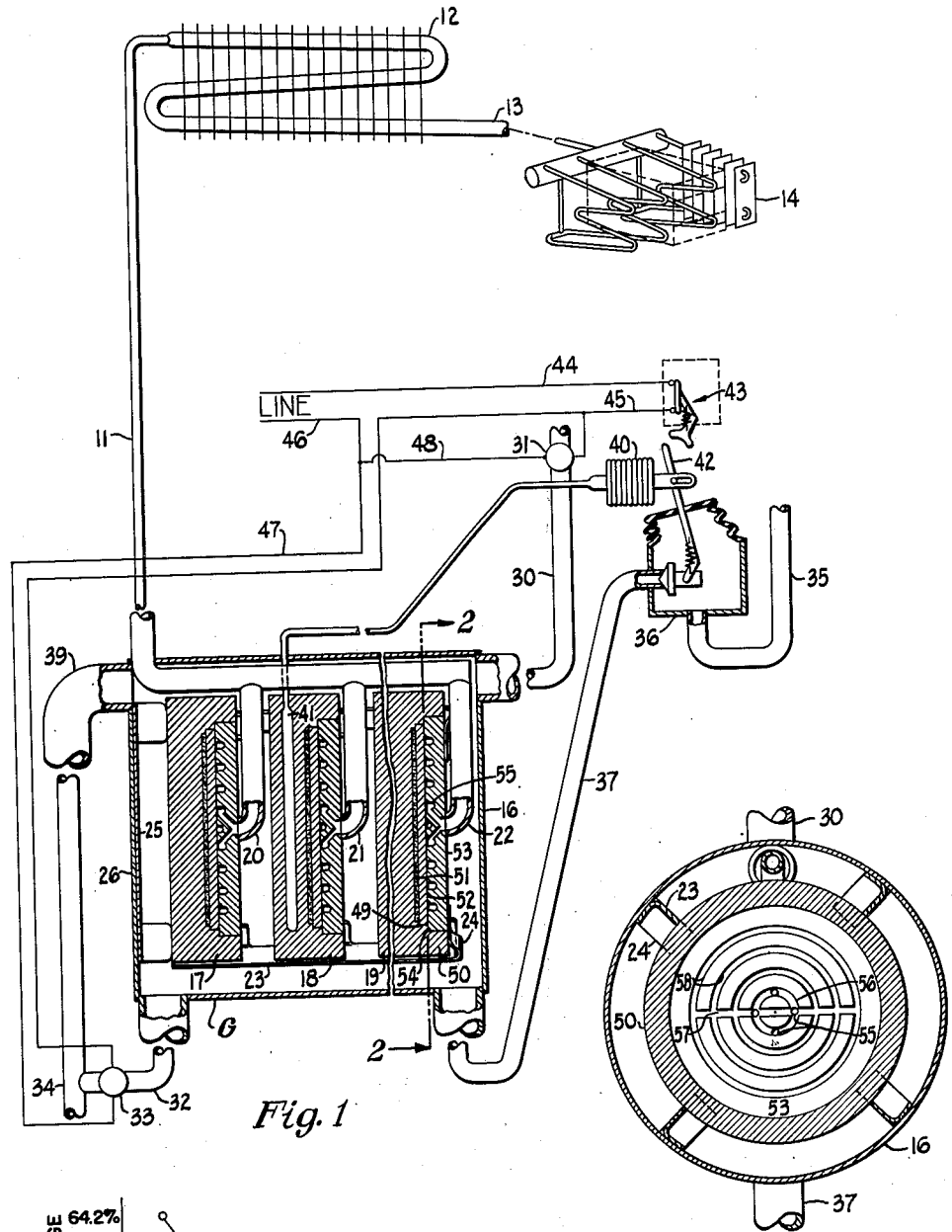
Fig. 1
Fig. 2
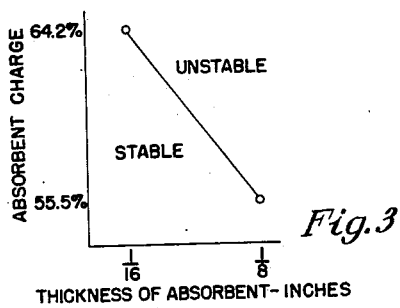
Fig. 3
INVENTOR.
Alfred G. Gross
BY
Harry S. Dumars
ATTORNEY.

Patented Jan. 6, 1953

2,624,182

UNITED STATES PATENT OFFICE 2,624,182

ABSORPTION REFRIGERATION APPARATUS

Alfred G. Gross, Wilmette, Ill., assignor to The Hoover Company, North Canton, Ohio, a corporation of Ohio Application May 21, 1949, Serial No. 94,539

11 Claims. (Cl. 62—118)

My invention relates to the art of refrigeration and is more particularly directed to an apparatus and method by which dry absorbents may effectively be utilized continuously without deterioration in performance of the unit and without progressive deterioration of the absorbent.

It is a principal object of my invention to provide a refrigerating system using a dry absorbent in which the charging density of the absorbent, the temperature differentials in the absorbent and the refrigerant flow paths through the absorbent are so controlled and related that the absorbent remains in stable, active condition in operation.

It is a particular object of my present invention to provide an apparatus and method of the dry absorption type refrigerating system in which the maximum internal pressures developed in the absorbent when absorbing or generating are insufficient to cause packing or migration thereof.

All previous dry absorption apparatuses with which I am familiar have ultimately been subject to failure due to failure of the absorbent to perform its intended function. It is characteristic of such prior apparatuses that the absorbing time thereof, other things and conditions being equal, progressively lengthens out. After this lengthening out process has continued for some period of time, tremendous disruptive pressures have been observed interiorly of the absorbent retaining structure generally sufficient to deform heavy internal structural members and frequently to rupture the outer pressure retaining vessel.

It is characteristic of all prior dry absorption apparatuses known to me that the absorbent does not remain in its initial position but migrates to certain areas where it packs into an exceedingly dense rock-like mass. These hard absorbent bodies become so dense that they are unable to participate in the refrigerating process by absorbing and generating.

I have discovered that dry absorbents can be retained in fully active, stable condition indefinitely if they are charged in the absorbent retaining space within certain limits and are heated and cooled under certain specified conditions. If these conditions are met, the internal pressures developed in the absorbent body during operation thereof are not great enough to produce migration or packing of the absorbent body even under most severe operating conditions and the absorbent remains stable and active.

It is a particular object of my invention to provide a generator-absorber structure so constructed and arranged that the absorbent is at all times subjected to uniform heating and cooling throughout its major dimensions and in which the maximum path of flow of heat through the absorbent is always less than certain maximum values.

It is a further object of my present invention to provide a generator-absorber structure in which the path of flow of refrigerant through the absorbent in generating and absorbing operation thereof is always held below certain maximum values.

It is a further object of my invention to provide a refrigerating apparatus in which the solid absorbent is held in thin bodies in a construction which prohibits the development of temperature differentials in the bodies in any direction except normal to the retaining walls and provides for refrigerant flow paths to and from the bodies normal to the extended surface thereof throughout such surface to prevent the development of disruptive internal stresses.

Other objects and advantages of the invention will become apparent as the description proceeds when taken in connection with the accompanying drawings in which:

Figure 1 is a partially schematic and partial sectional view of the refrigerating apparatus embodying my invention;

Figure 2 is a sectional view on an enlarged scale taken along the line 2—2 of Figure 1 looking in the direction of the arrows; and Figure 3 is a chart setting forth the conditions required to maintain absorbents stable in operation.

I have discovered that dry salt absorbents such as strontium chloride, strontium bromide, calcium chloride and similar substances can be maintained in stable, effective operating condition in the generator-absorber of a dry absorption refrigerating system provided certain conditions are adhered to. The migration and packing which has caused the progressive deterioration and destruction of all prior apparatuses known to me is primarily caused by the development of stresses or pressures within the absorbent body sufficient to displace portions of the absorbent. I have also discovered that there is a relationship between the density of the absorbent and the maximum heat flow paths through the absorbent which can be tolerated without producing progressive deterioration of the absorbent.

It is characteristic of dry absorbents of the type above mentioned that they tend to increase in volume to a large degree as the absorbing process proceeds. Absorbents such as strontium chloride, strontium bromide and calcium chloride will absorb eight molecules of ammonia for each molecule of the absorbent. In the operation of apparatuses utilizing these substances it is not generally feasible to generate and reabsorb more than seven of the eight molecules, consequently, an unsaturated compound consisting of at least one molecule of the absorbent and one molecule of the refrigerant remains in the generating vessel at all times. The absorbent refrigerant compound in all degrees of saturation of one molecule or more of the refrigerant is a porous substantially continuous body. If one portion of the absorbent body is cooled more effectively than another portion thereof during absorption, the more effectively cooled portion will absorb the refrigerant and hence endeavor to increase in volume at a greater rate than the less well cooled portions of the body. Unequal expansion, if unchecked, produces internal stresses and pressures in the absorbent which displace portions thereof and ultimately pack portions of the absorbent into dense inactive masses. Thermal differentials within the absorbent may rise from various causes. The means provided to heat and cool the absorbent may be so designed that the thermal paths to different portions thereof have different heat transfer characteristics. Another factor producing the effect of a thermal differential is unequal access of the various portions of the absorbent body to the refrigerant vapor. For example, if two portions of a single absorbent body are maintained at the same temperature and one of these has better access to the source of vapor being absorbed such body of absorbent will absorb the vapor at a more rapid rate than the other body again tending to produce the above described internal stress and pressure. The extent of the one quality immediately above mentioned may be expressed as the temperature difference corresponding to the static pressure head required to force the vapor from the area of best access to the vapor to the area of poor access to the vapor.

The internal pressures and stresses tending to produce displacement of portions of the absorbing body can be maintained at values insufficient to produce such displacement provided the conditions set forth hereinafter are adhered to.

Referring now to the drawing, Figure 3 is a chart graphically depicting the line of demarcation separating stable from unstable absorbent conditions. In this chart the ordinates are figures representing the charging density of the absorbent and the abscissae are figures which are a measure of the thermal stress in the absorbent under operating conditions. The charging density of the anhydrous dry absorbent is expressed as that percentage of 100 grams of ammonia required to saturate the absorbent charged in each 100 cc. of volume of absorbent space in the generator-absorber. Thus a 55% charge means that quantity of absorbent per 100 cc. of absorbent volume in the generator-absorber which will be saturated by 55 grams of ammonia. The terms "charging density" and "per cent charge" are used in this sense throughout this specification and the appended claims. The absorbent charge is expressed in terms of equivalent quantities of ammonia required to saturate the same to provide a common base to which to refer various absorbents. As shown in this figure, the end points on the curve are at 55.5% and 64.2%. These are the quantities of ammonia which will saturate 65 and 75 grams of strontium chloride, 101 grams and 116 grams of strontium bromide and 43.3 and 52.5 grams of calcium chloride, respectively. The thermal stress figure is given as the thickness of the absorbent body in inches. This figure is the thickness of the absorbent body if the same is in the form of a thin sheet held between confining walls all parts of which are maintained at the same instantaneous temperature. More basically the figures plotted as abscissae are, with reference to any single absorbent body, twice the maximum distance through absorbent between any point therein and a heat transfer body all parts of which are substantially at the same instantaneous temperature.

Expressed differently, the abscissae represent the maximum temperature differential existing in the absorbent body expressed as twice the maximum heat flow path through absorbent, in the direction of normal heat flow in operation thereof, between any two particles thereof which are at the upper and lower limits of the maximum temperature differential existing in the absorbent body.

The figures given in the chart of Figure 3 and above mentioned are subject to the further limitation that the maximum path of flow of the refrigerant vapor through the absorbent shall not be great enough to induce undesirable internal stresses and pressures in the absorbent body. The maximum path of flow of refrigerant through the absorbent is the distance between any particle of absorbent and the nearest orifice through which refrigerant may flow to such particle. Where a plurality of spaced refrigerant supply orifices are provided to supply refrigerant to the absorbent, many of the paths of flow through the absorbent will be angularly related to the axis or plane of the orifice; hence the distance separating certain parts of the absorbent and the nearest orifice will exceed the thickness of the absorbent body. This path of flow should not exceed twice the thickness of the absorbent body or four times the above defined maximum heat flow path and is preferably not more than twice the maximum heat flow path.

The curve of Figure 3 graphically illustrates the maximum thickness and charging density relations found to be stable. The curve of Figure 3 is susceptible of slight projection at each end; however, the limits as shown are safe practical maxima.

It is possible to operate absorbents in which the density is as great as 68%, $\frac{1}{32}$ inch thickness, however, such dense charges require extremely thin absorbent sheets. On the other end of the curve, the limitation of ⅛ inch can be exceeded slightly, however, increasing the thickness of the absorbent sheet coupled with the requisite decrease in charging density so diminishes the heat conducting efficiency of the absorbent that a thickness of $\frac{5}{32}$ of an inch, 51% charge, represents an extreme limit of absorbent sheet thickness.

Generator-absorbers maintained within the limits of the conditions graphically represented in Figure 3 have been successfully cycled many thousands of times under severe operating conditions without deterioration.

Referring now to Figures 1 and 2 there is illustrated a refrigerating system embodying the above specified conditions. The refrigerating apparatus comprises a generator-absorber assembly indicated generally at G which is connected by a refrigerant conduit 11 to an air cooled condenser 12 of any desired form. A conduit 13 connects the condenser 12 to an evaporator and refrigerant reservoir construction 14 which may be of any desired type. As illustrated the generator assembly G comprises an outer container 16 within which are mounted identical generator-absorber units 17, 18 and 19. The generator-absorber units 17, 18 and 19 are connected to the refrigerant conduit 11 by conduits 20, 21 and 22 respectively. The generating assembly G conforms to the conditions set forth above for retaining the absorbent in stable condition.

The generator-absorber units 17, 18 and 19 are supported within and spaced from all walls of the container 16 by a plurality of angle supports 23 having their bases engaging the inner wall of the container 16 and their flanges engaging the generator absorbers. The supports 23 are secured to the container 16 as by spot welding. The flanges of the supports 23 are cut away, except for small sections providing radial support for the generator-absorbers and to space them from the walls of container 16 so as not to interfere with the circulation of cooling and heating media as hereinafter described. The right hand ends of the supports 23 carry inwardly extending lugs 24 engaging the right hand end generator absorber to prevent the generator absorbers from shifting to the right. The left hand end of the generator absorbers abut lugs struck up from a plate 25 secured as by welding to the end wall 26 of the container 16. The connections between conduits 11 and 20 to 22 and the generator absorbers maintain proper lateral spacing of the generator absorbers.

The generator absorber structures contained within the container 16 are heated and cooled in a manner now to be described. Any suitable heating means such as live steam is supplied to the interior of container 16 through a conduit 30 which includes a normally closed and electrically opened control valve 31. Condensate formed in the chamber 16 is removed therefrom through a conduit 32 including a normally closed electrically opened valve 33 to a waste conduit 34.

Any suitable cooling means such as cooling water is supplied to the jacket 16 through a conduit 35, snap acting control valve structure 36 and conduit 37. Cooling water overflows from the upper portion of the container 16 through the conduit 39 which opens into the waste pipe 34.

Though only one refrigerating system has been shown and water and steam have been selected for illustrative purposes as the heating and cooling media, respectively, for the generator-absorbers it is within the scope of the invention to use a plurality of generator-absorbers operating in out-of-phase relation to each other and to use other heating and cooling means for the generator-absorbers in a manner well known in the art.

In the illustrated construction, the application of heating and cooling medium to the generator-absorber and the cycling of the refrigerating system are controlled by a thermostatic bellows 40 having the bulb portion 41 thereof in thermal contact with one of the generator-absorber elements, 18 for example. When the absorbent contained in the generator-absorber has relinquished its circulable or cycling charge of refrigerant, the temperature of the generator-absorber rises to approach the temperature of the heating medium. When the temperature of the generator-absorber 18 is at some predetermined value below the temperature of the heating medium, the bellows 40 will expand operating the rod 42 to snap the valve structure 36 to open position and the snap acting switch 43 to open circuit condition. Cooling medium flows into the jacket 16 when the valve 36 is opened. The snap acting switch 43 connects one supply line 44 to the valves 31 and 33 through the electrical conductor 45. The other side of the valves 31 and 33 are connected to the supply line 46 by the conductors 47 and 48 respectively. When the switch 43 is snapped to open circuit position the electrical operating means of the valve are de-energized and the valves are automatically closed. Cooling water completely fills the jacket 16 and flows across all faces of the generator-absorber units 17 to 19 inclusive. The water then overflows in the upper portion of the container 16 through the conduit 39 to the waste pipe 34.

The absorbing operation continues until the generator-absorbers have substantially absorbed all the refrigerant from the evaporator at which point the temperature then begins to drop rapidly to the temperature of the cooling medium. This causes the bellows 40 to collapse to the position illustrated which operates the rod 42 to close the snap acting valve 36 and the switch 43. This discontinues the supply of cooling water, opens the waste valve 33 to drain the cooling water from the jacket 16 and opens the valve 31 to supply steam to the jacket 16 for heating the generator-absorbers.

Since each of the generator-absorber elements 17 to 19 inclusive are identical only the element 19 will be described in detail.

The generator-absorber element 19 comprises a receptacle 50 in the base of which is positioned a very thin sheet 51 of dry absorbent such as strontium chloride, strontium bromide or calcium chloride. A diffusing element 52 of porous stainless steel contacts one face of the absorbent sheet within the receptacle 50 and rests on an annular step 49. The diffusor 52 is preferably made of sintered metal so that it has approximately 50% porosity which results in a structure of good heat conductivity through which gas flows freely but will not permit passage of the absorbent. A closure plate 53 rests on an outer annular step 54 in the receptacle 50 in tight engagement with the outer face of the diffusor 52. The plate 53 is secured to the receptacle 50 in gas tight relation as by welding. The base of the plate 53 engaging the diffusor 52 is provided with refrigerant distributing channels illustrated more clearly in Figure 2. The conduit 22 connects to a series of angular conduits or bores 55 in the plate 53 which open into a central annular channel 56. The channel 56 communicates with a radial diametrical channel 57 which in turn communicates with a series of annular distributing channels 58 positioned at varying distances from the center of the plate 53. The distributing channels in the plate 53 conduct refrigerant vapor to and remove vapor from numerous closely adjacent portions of the outer face of the diffusor 52. The refrigerant passes into and out of the absorbent to and from the diffusor uniformly over the entire area of the thin absorbent sheet 51 normal to the plane thereof. This is an important feature of my invention because it prevents unequal absorption within the absorbent body of a degree sufficient to produce migration of the absorbent.

In charging the apparatus it is preferable to place finely ground anhydrous absorbent in the receptacle 50. The same is then evenly distributed to form a thin, uniform thickness sheet. The diffusor plate 52 is then lightly pressed onto its seat 49 after which the cover plate 53 is pressed into the receptacle 50 onto its seat 54 therein and welded. It is preferable at this point to apply heat to the assembled apparatus and to draw a vacuum upon the absorbent in order to relieve the same of residual traces of water or other volatile material. The absorbent is then fully charged with refrigerant by being connected to a charging drum in any suitable manner. When this operation is completed the charging valve, not shown, can be closed and the apparatus is ready for operation.

Ammonia is the preferred refrigerant; however, it is within the scope of my invention to utilize other known refrigerants which are absorbed by solid absorbents. Whatever refrigerant is use, it is preferred to calculate the absorbent charge on the basis of certain equivalent charges of ammonia in order to provide a uniform basis of comparison between the various absorbents.

All portions of the apparatus in contact with ammonia which operate substantially above atmospheric temperatures must be constructed of materials which do not react chemically with ammonia vapor. Stainless steel is a preferred material for this purpose. If the generator-absorber structures proper and their connecting points are made of iron, a non-flaking, continuous and firmly adherent nitride coat should be applied to these parts before the refrigerant charge is placed in the apparatus. These precautions are necessary to prevent the slow iron-ammonia reaction which occurs in the generator-absorber at generating temperatures and releases free hydrogen. This reaction is a slow nitriding process and the hydrogen liberated thereby greatly reduces the efficiency and reaction speed of the apparatus.

It is preferred to use a diffusor such as the above described plate 52; however, this is not an essential construction. A series of fine mesh screens pressed against the absorbent and closure plate 53 to prevent the absorbent from entering the ammonia distributing structure 55 to 57 inclusive can be utilized in place of the porous metal plate 52.

The structure illustrated in Figures 1 and 2 may be designed for any thickness of absorbent sheet within the limits set forth above in reference to Figure 3. Once the absorbent sheet thickness is decided upon, the maximum charging density is determined for that thickness from Figure 3 and the absorbent is charged in the generator-absorber accordingly. This structure allows the heating and cooling media to flow over all faces of the absorbent containing receptacles so as to maintain the absorbent contacting walls at a substantially uniform instantaneous temperature which limits the effective heat flow path through the absorbent to approximately one-half the thickness of the absorbent sheet. The porous diffusor plate which contacts one entire face of the absorbent sheet provides for uniform access of refrigerant vapor to the absorbent with a maximum flow path through absorbent equal to the thickness of the absorbent sheet.

While I have illustrated and described the invention in considerable detail, it is to be understood that various changes may be made in the arrangement, proportion and construction of parts without departing from the spirit of the invention or the scope of the appended claims.

I claim:
1. Generator-absorber structures containing solid absorbents and having a wall including a heat transfer surface through which the solid absorbent is heated or cooled and means for heating or cooling said wall to maintain said surface at a substantially uniform temperature in which the charging density of said absorbent is within the limits of 55% of charging density with no part of said absorbent distant from said wall more than $\frac{1}{16}$ inch and 65% charging density with no part of said absorbent distant from said wall more than $\frac{1}{32}$ inch respectively.

2. Apparatus according to claim 1 in which the generator-absorber structure includes means for conveying refrigerant vapor to and from the absorbent and said conveying means includes a plurality of distributing parts having vapor passage outlets so placed in reference to the absorbent that no particle of the absorbent is distant from at least one of said distributing outlets by an amount exceeding four times said maximum distance.

3. In an absorption refrigerating system, a plurality of walls defining an absorbent retaining space, an absorbent charge in said space within the range of 55% and 65% charging density, refrigerant vapor conveying means communicating with said space, means for maintaining all of said walls in contact with said absorbent at a substantially uniform instantaneous temperature, said walls being so constructed and arranged that no portion of said absorbent is more distant from some part thereof by an amount varying with said charge range from $\frac{1}{16}$ inch for a 55% charging density to $\frac{1}{32}$ inch for a 65% charging density, respectively.

4. In an absorption refrigerating system, a plurality of walls defining an absorbent retaining space, and absorbent charge in said space within the range of 55% to 65% charging density, refrigerant vapor conveying means communicating with said space, means for maintaining all of said walls in contact with said absorbent at a substantially uniform instantaneous temperature, said walls being so constructed and arranged that no portion of said absorbent is more distant from the nearest part of said walls by an amount varying with said charge range from $\frac{1}{16}$ inch for a 55% charging density to $\frac{1}{32}$ inch for a 65% charging density, said distributing means including a plurality of vapor passages having outlets communicating with said absorbent space at points such that no portion of said absorbent is distant from the nearest one of said outlets by an amount exceeding twice the maximum distance between any portion of said absorbent and one of said walls.

5. In a refrigerating apparatus, a plurality of generator-absorbers, each of said generator-absorbers comprising a shallow receptacle, means for securing a porous metal vapor and heat conductor in said receptacle in spaced relation and parallel to the bottom of said receptacle, a closure plate secured to said receptacle in gas tight relation and in heat conducting relation to said conductor, and means for conducting refrigerant vapor to and from said porous metal conductor; a housing for said generator-absorbers, means for supporting said generator-absorbers in said housing in spaced relation to the walls thereof and to each other, and means for flowing heating and coolings media through said housing over all the exterior walls of said generator-absorbers.

6. In an absorption refrigerating apparatus, a vessel forming a generator-absorber having an absorbent retaining and heat conducting wall structure, an absorbent charge in said vessel in which the charging density of said absorbent is within the limits of 55% to 65% and the maximum distance of any part of said absorbent charge from said heat conducting wall structure is within the limits varying with said charging density of $\frac{1}{16}$ inch for a 55% charging density to $\frac{1}{32}$ inch for a 65% charging density.

7. Apparatus according to claim 6 including means for conveying refrigerant vapor to and from said absorbent charge having outlets to said absorbent charge distributed so that no part of said absorbent charge is distant from the nearest of said outlets by an amount exceeding two times said maximum distance.

8. In an absorption apparatus, a generator-absorber of the solid absorbent type provided with heat conducting walls, a solid absorbent charged in said generator-absorber in contact with said walls, said absorbent having a charging density within the range of 55% to 65% and the maximum distance of any part of said absorbent charge from the nearest part of said walls in within the range varying with said charging density of $\frac{1}{16}$ inch for a 55% charging density to $\frac{1}{32}$ inch for a 65% charging density, and means for uniformly heating and cooling said walls to maintain all parts thereof in contact with said absorbent charge at uniform instantaneous temperatures.

9. In an absorption refrigerating apparatus, a generator-absorber comprising a vessel adapted to retain an absorbent, said vessel including an internal wall structure defining an absorbent retaining chamber for heating and cooling an absorbent in said chamber and for conducting refrigerant vapor to and from an absorbent in said chamber, an absorbent charge in said chamber in which the absorbent charge is within the limits of 55% to 65% charging density and the maximum distance of any part of said absorbent from a heating and cooling wall structure is within the limits varying with said charging density of $\frac{1}{16}$ inch for a 55% charging density to $\frac{1}{32}$ inch for a 65% charging density, and means for heating and cooling said vessel to maintain said heating and cooling wall structure at substantially uniform instantaneous temperatures.

10. Apparatus according to claim 9 in which all parts of said absorbent are within two times said maximum distance of said vapor conducting member.

11. In an absorption refrigerating apparatus, a vessel forming a generator-absorber having a pair of spaced parallel heat conducting walls, a porous metal heat conductor and absorbent retainer between said walls in spaced relation to one of said walls and engaging the other of said walls, means for heating and cooling said walls and said porous metal member uniformly, said other of said walls being formed with passageways for conducting vapor to and from said porous metal member, and an absorbent charge in said vessel retained between said one wall and said porous metal member in which the charging density of said absorbent and the maximum distance of any part of said absorbent from said one wall or said porous metal member are within the limits of 55% charging density with said maximum distance not more than $\frac{1}{16}$ inch and 65% charging density with said maximum distance not more than $\frac{1}{32}$ inch.

ALFRED G. GROSS.

REFERENCES CITED

The following references are of record in the file of this patent:

UNITED STATES PATENTS

| Number | Name | Date |
| --- | --- | --- |
| 1,246,866 | Browne | Nov. 20, 1917 |
| 1,331,356 | Ormandy | Feb. 17, 1920 |
| 2,019,356 | Normelli | Oct. 29, 1935 |
| 2,224,219 | Dasher | Dec. 10, 1940 |

OTHER REFERENCES

Refrigerating Engineering, September 1933, pages 137 through 142, Absorption Refrigeration With Solid Absorbents.